Feb. 27, 1923.

J. L. GRONDONA

AUTOMOBILE SANDING DEVICE

Filed May 22, 1922

1,446,897

Inventor.
John L. Grondona.

By Harry Schnede
Attorney.

Patented Feb. 27, 1923.

1,446,897

UNITED STATES PATENT OFFICE.

JOHN L. GRONDONA, OF OAKLAND, CALIFORNIA.

AUTOMOBILE SANDING DEVICE.

Application filed May 22, 1922. Serial No. 562,659.

*To all whom it may concern:*

Be it known that I, JOHN L. GRONDONA, a citizen of the United States, residing at Oakland, in the county of Alameda and State of California, have invented certain new and useful Improvements in Automobile Sanding Devices, of which the following is a specification.

My invention is a sanding device for automobiles, which is mounted on the automobile so as to deliver sand in front of the rear wheels to prevent them from slipping and may be operated by a foot pedal.

Referring to the annexed drawing in which my invention is illustrated and which forms a part of this specification:

Figure 1:
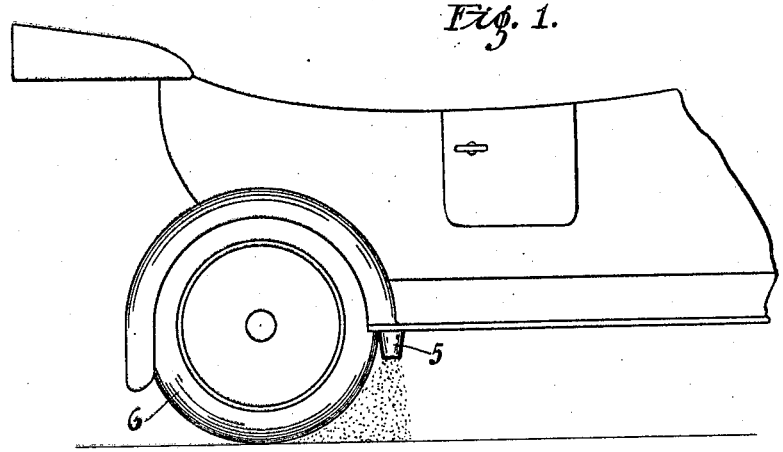
Figure 1 is a side elevation of the rear portion of an automobile and my sanding device mounted thereon.
Figure 2:
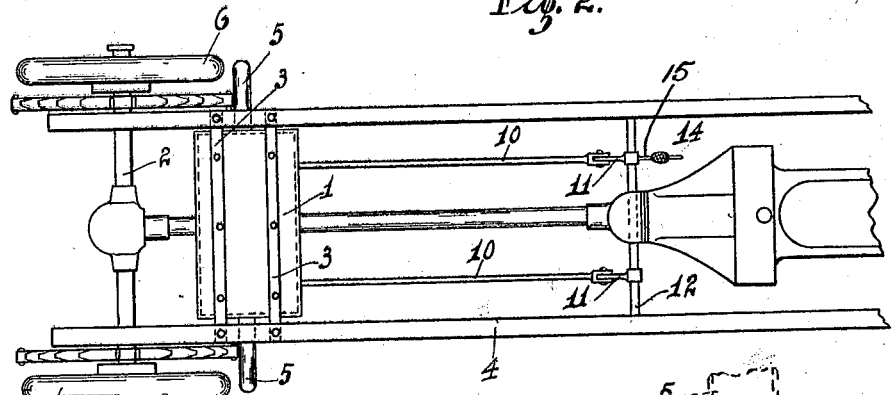
Figure 2 is a top plan view of the running gear of said automobile and my sanding device mounted thereon.
Figure 3:
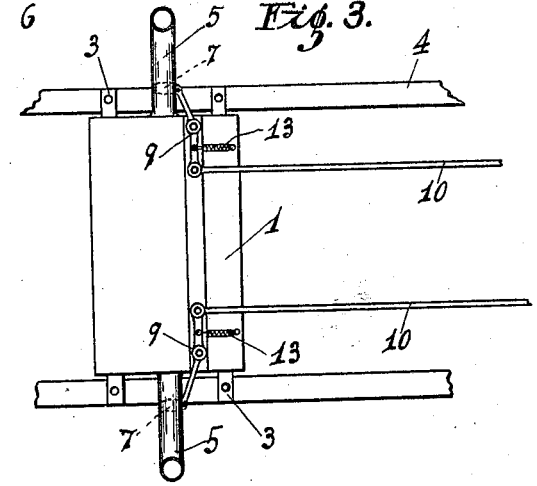
Figure 3 is a fragmentary bottom plan view of the rear portion of said automobile and my sanding device mounted thereon.
Figure 4:
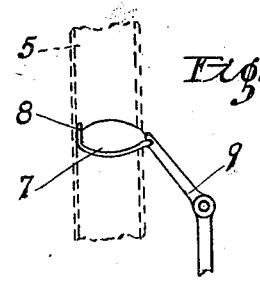
Figure 4 is a plan view of the sand delivery valve.

In the drawing 1 indicates a sand box which is suspended forwardly of the rear axle 2 of the automobile on bars 3 extending transversely of the automobile and secured on the automobile chassis 4. From the ends of the box 1 spouts 5—5 project downwardly in front of the rear wheels 6—6 of the automobile. In each spout 5 is mounted a sliding valve 7 on the inner end of which is formed a lip 8 for engaging the wall of the spout to prevent the valve from being pulled out of the spout. Levers 9—9 are pivoted on the box 1, to one end of which are respectively pivoted the outer ends of the valves 7—7. To the other end of said levers are connected the rear ends of rods 10—10 respectively extending longitudinally of the automobile within the chassis 4, the forward ends of which rods being connected to depending arms 11—11 respectively secured on a shaft 12 extending transversely of the forward part of the chassis 4 and journaled on the side members of said chassis. Springs 13—13 are connected to the levers 9—9 respectively and to the sand box 1 for normally holding the valves 7—7 closed. A pedal 14 is secured to the shaft 12 at the left of the automobile, which pedal may be depressed by the driver of the automobile to open the valves 7—7 through the medium of the levers 9—9, rods 10—10, arms 11—11 and shaft 12, so that sand will drop from the box 1 through the spouts 5—5 in front of the rear automobile wheels 6—6, whereby the rear wheels are prevented from slipping.

Having described my invention, I claim:

A sanding device for automobiles including a sand box mounted on the automobile, an outwardly extending spout depending from each side of the sand box in front of the rear wheels, a valve in each spout, a lever connected at one end to each of said valves respectively, a spring attached to each lever to hold the valves normally closed, rods connected at their rear ends to the other ends of said levers, a shaft journaled on the forward part of the automobile, a lever fulcrumed on the shaft and adapted to turn the shaft, one end of the lever being a pedal and the other end connected to one of the rods, a crank arm rigidly mounted on the shaft and having the crank attached to the other rod so that as the pedal is pushed the aforementioned parts will be actuated to open the valves.

In testimony whereof I affix my signature.

JOHN L. GRONDONA.